United States Patent [19]

Sippol et al.

[11] 3,821,569

[45] June 28, 1974

[54] ELECTRIC MACHINE ROTOR

[76] Inventors: Nikolai Karlovich Sippol, Tamlovskaya ulitsa 67, kv. 13; Alexandr Andreevich Saly, Prospekt Kosmonavtov, 92, kv. 227, both of Leningrad, U.S.S.R.

[22] Filed: Nov. 16, 1972

[21] Appl. No.: 307,227

[52] U.S. Cl. .............................................. 310/64
[51] Int. Cl. ......................... H02k 3/22, H02k 3/24
[58] Field of Search ............ 310/64, 54, 58, 60, 61, 310/60 A, 52, 65

[56] References Cited
UNITED STATES PATENTS

| | | |
|---|---|---|
| 3,075,104 | 1/1963 | Willyoung ............ 310/64 |
| 3,243,616 | 3/1966 | Tudge ................. 310/54 |
| 3,543,062 | 11/1970 | Banchieri ............ 310/54 |
| 3,569,752 | 3/1971 | Tomlinson ........... 310/61 |
| 3,582,977 | 6/1971 | Smith ................. 310/54 |
| 3,622,820 | 11/1971 | Tjernstrom ......... 310/54 |
| 3,652,882 | 3/1972 | Elliott ................ 310/61 |
| 3,733,502 | 5/1973 | Curtis ................ 310/61 |

*Primary Examiner*—R. Skudy
*Attorney, Agent, or Firm*—Eric H. Waters

[57] ABSTRACT

The rotor structure of an electric machine rated at up to 2,000 mV and above, the rotor having a winding made up of pipes or hollow conductors through which a cooling liquid is passed. The rotor structure is characterized in a construction to provide the feed of a liquid coolant to the hollow conductors of the rotor winding from the shaft grooves as well as the discharge of the liquid coolant from the hollow conductors of the rotor winding into the shaft grooves. It employs a hydraulic manifold mounted on an overhanging retainer ring and comprising a pressure chamber and an overflow chamber as well as longitudinal channels, the pressure and overflow chambers being disposed intermediate of the longitudinal channels and the manifold surface facing the rotor shaft, which longitudinal channels communicate with the chambers by way of channels lying in the radial planes of the manifold. The hydraulic manifold is connected with the rotor winding conductors by means of endpieces fixed on each pair of conductors and fitting into the longitudinal channels of the manifold, and with the rotor shaft via longitudinal mounted pipes. One end of each pipe fits into one of the shaft grooves at the base of the steel housing of the rotor shaft, whereas the other end fits into that manifold orifice which communicates with either the pressure chambers, or the overflow chamber.

6 Claims, 3 Drawing Figures

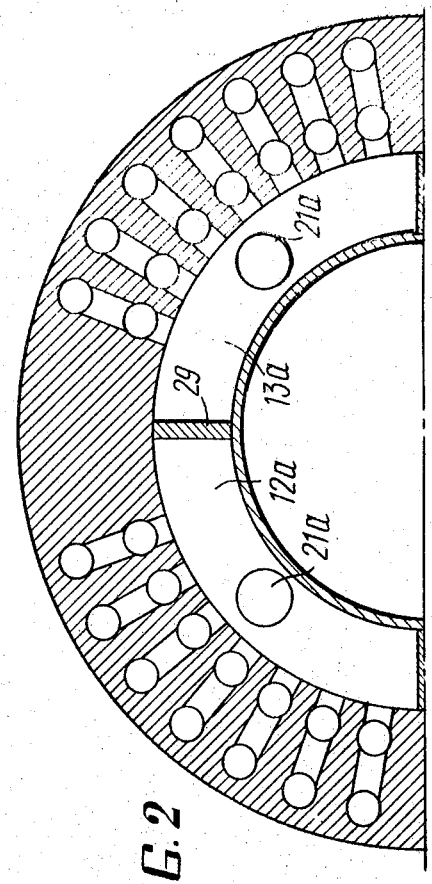
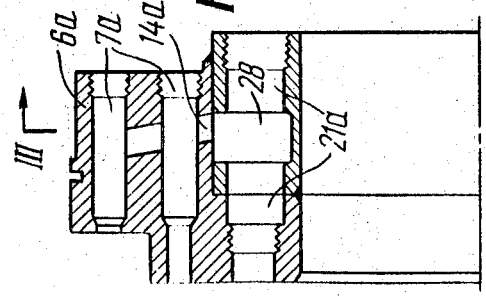
FIG.2
FIG.3

ELECTRIC MACHINE ROTOR

The invention relates to electric machines and, more particularly, to the rotor structure of an electric machine, having a winding formed by pipes or hollow conductors through which a coolant is passed.

Heavy-duty electric machines and, in particular, turbogenerators, are developed along the lines of increasing unit power. Unit power increase leaves far behind the actual increase in the effective capacity of the turbogenerator and, hence, the factor of machine utilization, and, consequently, the electromagnetic loading of its generating parts, particularly its rotor winding, also increase. Therefore, the increasing unit power of a turbogenerator calls for a more efficient cooling system to be provided for an electric machine and particularly for its rotor winding.

At the beginning turbogenerator development, the rotor winding was cooled by air circulating in the machine, which removed heat from the winding through the machine's steel and insulation - the so-called indirect rotor winding air cooling. Such a system of cooling permitted the construction of turbogenerators rated up to 100 mW. Experience proved, however, the indirect air cooling of the rotor winding to be impracticable for turbogenerators rated at 30 MW and higher. As a consequence, in turbogenerators manufactured in the range from 30 to 150 mW, the rotor winding was cooled, instead of with air, with hydrogen, a gas known for its higher cooling capability (hydrogen has a higher heat transfer coefficient than air). In this way there originated indirect hydrogen cooling of the rotor winding, in other words heat removal through the machine's steel and insulation, but this time employing hydrogen circulating in the machine.

As the power ratings rose still higher (above 150 mW), a demand was created for cooling the rotor winding even more intensively, which could be met by bringing the cooling agent-hydrogen directly to the bare turns of the winding bypassing the steel and insulation. Hydrogen thus came in contact with the copper of the winding directly. This was termed: direct hydrogen cooling of the rotor winding. This system offers one important advantage over the indirect cooling system, in that it precludes temperature drops in the machine's steel and insulation during the process of heat transfer. Direct hydrogen cooling of the rotor winding turned out to be so effective as to allow turbogenerators to be constructed for power ratings from 50 mW up to 1,000 mW.

Nevertheless, at 800 mW the rotor winding was found to require a still more efficient system of cooling, which accounts for the current research into cooling systems for the rotor winding which employ water. There have already been constructed pilot turbogenerators employing water for cooling. Water has a distinctly higher heat transfer coefficient and a higher heat capacity than hydrogen. However, in contrast with a gas, water must not contact the insulation and the effective steel parts of the machine. Consequently the rotor winding began to be manufactured from copper piping (hollow conductors) in which circulated cooling water to effect direct water cooling of the winding.

However, the difficulties in designing, manufacturing and reliably operating turbogenerators having a water-cooled rotor winding have so far prevented their production.

The chief difficulties arise in regard to the water supply to the hollow winding conductor. The system of water supply should be insulated so securely as to rule out the hazard of an electric breakdown of the winding and the possibility of electrolytic processes.

As at the sites of water delivery, there arise substantial hydraulic pressures (as high as 200 atm) due to the centrifugal forces caused by the rotor revolving at a speed up to 3,000 rpm, and the problem of hermetic sealing of the conductors is quite serious.

It is likewise necessary to prevent shaft vibrations from being transmitted to the water feed lines lest the latter should be destroyed and depressurized, and this is a formidable problem, too. In addition, the water feed lines must be accessible for their assembly, disassembly and repair.

As the power ratings grow, the mentioned difficulties become more pronounced since a more intensive cooling of the rotor is required. This is achieved by increasing the number of hydraulic circuits. If the number of hydraulic parallel branches is not increased proportionately with the increasing water flow rates, the hydraulic resistance of the entire cooling system would become exorbitant thereby causing water pressure increase in the system several times greater than that due to centrifugal forces. This would consequently render the problem of hermetically sealing the lines for feeding water to the winding practically insoluble.

Thus, it was necessary to provide turbogenerator rotor windings with multi-parallel cooling systems whereby water should be delivered into each individual turn or even half-turn of the winding.

Designing practice has shown that, if a turbogenerator rotor winding is to be provided with a multi-parallel cooling system, it is most practicable to use a loop (or wave) arrangement of its front parts for affording the greatest degree of accessibility to each winding turn and half-turn.

The commonly used winding with a concentric arrangement of its front parts is hardly suitable for a multi-parallel hydraulic system as it offers poor access to each turn and half-turn.

With a turbogenerator rotor winding cooled with water, the water is first delivered into rotor shaft grooves and thence into the winding. The discharge is effected in a reverse order i.e., from the winding, water is discharged into the shaft grooves and thence out of the system. Hence, there must be a hydraulic connection between the shaft grooves and the winding. For a multi-parallel cooling system a hydraulic manifold proved convenient as such a connection.

At the initial stages of manufacturing rotors having winding water cooling systems with a relatively small number of hydraulic parallel branches, for example with the delivery of water into each pair of hydraulically series-coupled coils, into one coil or a half-coil, the rotor designs did not incorporate a hydraulic manifold. Yet even then the part of the hydraulic manifold was played by special ducts made in the shaft or by a ring rigidly set on the shaft and communicating by way of its chambers with the ducts in the shaft. However, in the former arrangement, the delivery and discharge of water is a problem since the body of the rotor shaft having a limited space is not capable of accomodating a substantial number of feed and drain lines, and in the second arrangement, the collector rigidly mounted on the shaft transmits the shaft vibrations to the feed lines which, for lack of space cannot be formed as vibration compensators.

The Swiss company B.B.C. ("The Brown Boveri Review", 1966, No. 9, pp. 501–511) has developed a turbogenerator having a rotor winding cooling system in the form of a loop on the feed and drain sides and incorporating a hydraulic manifold in the form of a cylinder mounted on the side of the winding front end and fixed on a cantilever-mounted retainer ring. The manifold has a circular hollow divided by radial partitions into two pressure and two overflow chambers directly communicating with channels made in the body of the manifold, through which the chambers communicate with the winding via end pieces fixed on the winding turns. The manifold is made up of two portions sealed by means of two ring packings. In order to provide access for repairs to the longitudinal channels in the manifold housing insulating and packing parts, the manifold has to be disassembled and, consequently, decompressed.

The manifold is likewise to be disassembled to provide access to the packings of the radial pipes hydraulically linking the manifold chambers and the rotor shaft.

According to Swiss Pat. No. 447353 HOK9/16 filed in 1967, the manifold chambers and the rotor shaft are hydraulically linked by radial pipes and a central pipe passing through the body of the shaft and separated from the latter by clearances.

Such a design has a disadvantage which consists in the necessity of disassembling and decompressing the hydraulic manifold every time it is necessary to provide access to the insulating and packing parts housed by the manifold.

With radial pipes and a central pipe used to connect the manifold and the shaft and passing through the body of the shaft, it is extremely difficult to hermetically seal the pipes and provide the clearances between the pipes and the shaft, intended to prevent shaft vibrations from being transmitted to the pipes.

It is an object of the present invention to avoid these disadvantages.

It is a specific object of the present invention to provide a system of feeding water to, and discharges it from, the winding of a machine rotor which ensure easy access to the insulating and packing parts of the manifold and provides for a more convenient assembly of the pipes connecting the manifold chambers with grooves in the shaft.

The invention resides in that the rotor of an electric machine comprises a shaft with internal bores, a winding made up of hollow conductors through which a cooling liquid is fed and a hydraulic manifold comprising pressure and overflow chambers, which manifold is rigidly mounted on a retainer ring of the front part of the winding, which chambers communicate with the hollow conductors of the winding by way of longitudinal channels of the manifold, wherein the longitudinal channels of the manifold, in accordance with the invention, extend to the end surface of the manifold which is at the same time the end surface of the rotor and communicate with said manifold chambers by way of radial channels, the pressure and overflow chambers of said manifold being disposed intermediate of said longitudinal channels and the surface of the manifold which faces the rotor shaft, whereas the open orifices of said longitudinal channels on the end surface of the manifold are closed with removable elements.

The removable element is preferably a threaded stopper.

The pressure and overflow chambers are preferably in communication with the bores in the shaft through longitudinally mounted pipes, each end of each pipe being fixed on the hydraulic manifold and the other end being fixed at the base of the rotor shaft.

It is also desirable that the said pipes be disposed in the slots of the rotor shaft.

The herein disclosed design of an electric machine rotor of this invention may find wide application in turbogenerators rated at 2,000 mW and even above as providing high reliability in operation and ease in manufacture. Preliminary tests on models and pilot units have proved successful.

The present invention will be better understood from the following detailed description thereof taken in conjunction with the accompanying drawings, where concrete narrow terminology is used for the sake of clarity; however, the invention is not confined to the conventional terms, and it must be borne in mind that each term covers all the equivalent elements functioning in a like manner and employed to solve the same problem as those for which the present invention is intended.

It should also be borne in mind that other objects and advantages of the present invention, alongside those earlier mentioned, will be appreciated from the following description thereof with reference to the accompanying drawings, wherein:

FIG. 2 is a longitudinal sectional view of a hydraulic manifold having their pressure and overflow chambers in one and the same transverse plane and FIG. 3 is a cross-sectional view of a hydraulic manifold having pressure and overflow chambers in one and the same transverse plane, taken along the line III—III of FIG. 2.

Figure 1:
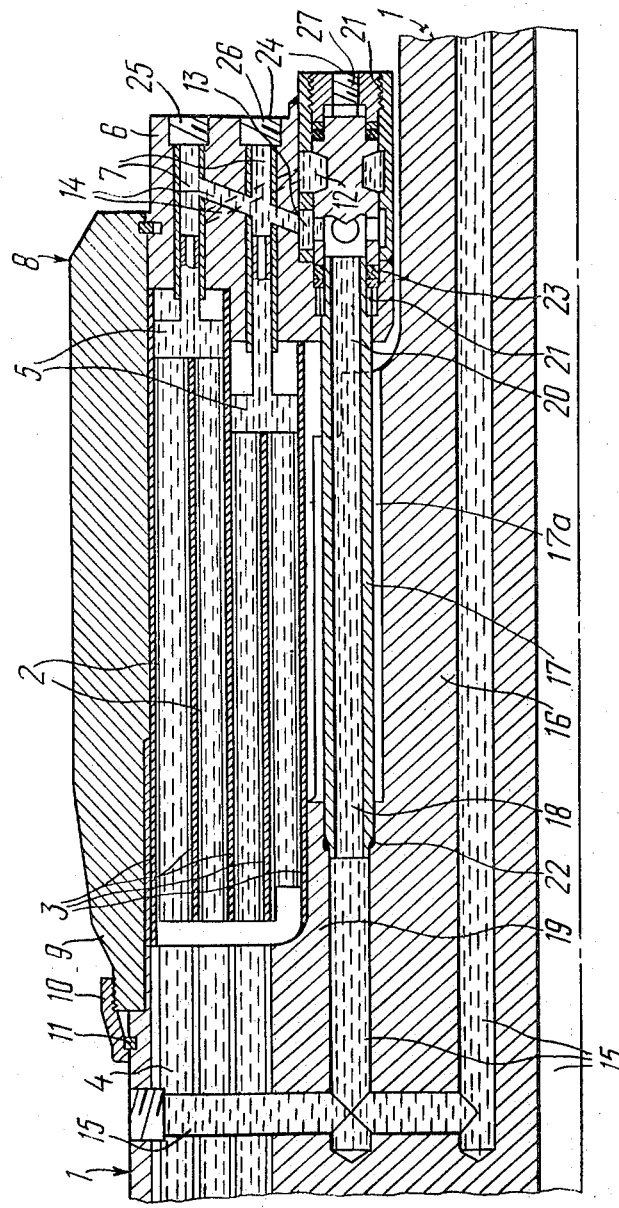
FIG. 1 is a longitudinal sectional view of the part of an electric machine rotor on the side of the feed to, and discharge from, the winding hollows of a cooling liquid, with a hydraulic manifold having pressure and overflow chambers disposed in different transverse planes.

In one embodiment of the invention, an electric machine rotor 1 (FIG. 1) has a winding made up of bare hollow conductors 2 insulated from one another with gaskets 3. The winding conductors 2 are disposed within an effective part of steel housing 4 of the rotor 1 so as to partially extend therefrom. Secured to each two conductors 2 extending from the effective part 4 of the winding are endpieces 5 connected to a hydraulic manifold 6 by way of longitudinal channels 7. The manifold 6 is fixed on a cantilever-mounted retainer ring 8 which is fixed at its side 9 to the steel housing 4 of the rotor and restrained from longitudinal displacement by a nut 10 and a key 11. The manifold 6, apart from the longitudinal channels 7, has a pressure chamber 12 and an overflow chamber 13 formed as circular hollows. The pressure chamber 12 and the overflow chamber 13 communicate with the longitudinal channels 7 by way of channels 14 disposed in radial planes of the manifold 6.

The pressure chamber 12 and the overflow chamber 13 communicate with bores 15 of a shaft 16 in the rotor 1 through longitudinally mounted pipes 17, each said pipe 17 having an end 18 fitting into one of the bores 15 of the shaft 16 at a base 19 of the steel housing 4, the other end 20 fitting into an orifice 21 of the manifold 6, which orifice communicates with either the pressure chamber 12 or the overflow chamber 13. The pipes extend in slots 17a formed in shaft 16.

Both ends 18 and 20 of each of the pipes 17 have packing gaskets 22 and 23. The longitudinal channels 7 extend to an end surface 24 of the manifold, which surface serves at the same time as the end surface of the rotor; the orifices defined by said channels are closed with threaded stoppers 25 and 26. Additionally, the manifold has a hole closed with a threaded stopper 27.

The herein desclosed manifold is employed for a rotor winding with alternating pressure and overflow ends of conductors. If the pressure and overflow ends of the winding conductors extending from the effective part of the rotor core form bunches, each bunch comprising either only pressure conductor ends or only overflow conductor ends, then a manifold 6a (FIG. 2) is employed. The manifold 6a differs from the manifold 6 of FIG. 1 in that pressure chambers 12a and overflow chambers 13a (FIG. 3) are disposed in the same circular hollow 28 of the manifold 6a (FIG. 2), which hollow is divided by radial partitions 29 (FIG. 3) into sections forming the chambers 12a and 13a.

The liquid cooling the winding conductors 2 (FIG. 1) of the rotor 1 is delivered from the bores 15 of the shaft 16 into the pipes 1--17 and thence into the pressure chamber 12 (FIG. 1) or 12a (FIG. 3), and then, through the channels 14 (FIG. 1) or channels 14a (FIG. 2), passes into the channels 7 (FIG. 1) or channels 7a (FIG. 2). Therefrom, through the endpieces 5 of FIG. 1, the cooling liquid is passed into the winding conductors 2 of the rotor 1. The cooling liquid is discharged in a similar manner.

Access to the insulating and packing elements of the manifold disposed in the channels thereof is obtained by simply unscrewing the stoppers 25, 26 and 27.

What is claimed is:

1. An electric machine rotor comprising a shaft with longitudinal bores therein, a winding on said shaft including hollow conductors through which a liquid coolant is to be passed, and a hydraulic manifold rigidly secured to said shaft and having a surface facing said shaft, said manifold comprising at least one pressure chamber and at least one overflow chamber, communicating with the hollow conductors of the winding by the provision of at least two longitudinal channels in the manifold, said manifold having an end surface which serves as the end surface of the rotor, said longitudinal channels extending to said end surface, said manifold having radial channels connecting the longitudinal channels with said manifold chambers, said pressure chamber and said overflow chamber being disposed between the longitudinal channels and said surface of the manifold which faces the rotor shaft, said longitudinal channels having open orifices at said end surface of the manifold, and removable stopper elements in said channels at said orifices closing said channels.

2. An electric machine rotor as claimed in claim 1, wherein said removable stopper elements are threaded in said channels.

3. An electric machine rotor as claimed in claim 1, wherein said pressure chamber and said overflow chamber in the manifold communicate with the bores in said shaft by at least two longitudinally mounted pipes, each pipe having one end fixed in said manifold and the other end fixed at the base of a steel housing of the shaft.

4. An electric machine rotor as claimed in claim 3 wherein said pipes are disposed within slots provided in the rotor shaft.

5. An electric machine rotor as claimed in claim 3 comprising sealing means at each of said ends of the pipes.

6. An electric machine rotor as claimed in claim 1 comprising a cantilever ring having one end secured to said shaft and a free end to which said manifold is fixed.

* * * * *